United States Patent
Schuster

[11] 3,893,472
[45] July 8, 1975

[54] MANUALLY CONTROLLED REGULATOR VALVE WITH EXHAUST CONTROL

[75] Inventor: David A. Schuster, New Boston, Mich.

[73] Assignee: General Motors Corporation, Detroit, Mich.

[22] Filed: June 12, 1974

[21] Appl. No.: 478,597

[52] U.S. Cl............................. 137/116.3; 74/867
[51] Int. Cl.......................................... B60k 23/00
[58] Field of Search .......... 137/116.3; 74/867, 868, 74/869

[56] References Cited
UNITED STATES PATENTS
3,180,173   4/1965   Fisher et al.......................... 74/868

*Primary Examiner*—Robert G. Nilson
*Attorney, Agent, or Firm*—Donald F. Scherer

[57] ABSTRACT

A manually controlled variable pressure reducing valve having an exhaust passage which is closed when the manual control is disconnected. When the exhaust passage is closed, the pressure at the valve outlet, which normally provides a control function, becomes equal to input pressure. If the manual control is disconnected, the loss of control pressure in the system is prevented, and maximum control pressure is established. This is particularly useful in automatic transmission controls where throttle pressure is generated by a manual TV valve.

3 Claims, 4 Drawing Figures

3,893,472

MANUALLY CONTROLLED REGULATOR VALVE WITH EXHAUST CONTROL

This invention is related to pressure reducing valves and more particularly to pressure reducing valves used as throttle pressure valves in automatic transmission controls.

The present invention will find particular use as a manually operated throttle valve for an automatic transmission. Prior art transmission control systems have utilized manually operated throttle valves to provide a variable pressure signal in response to throttle position which signal is utilized to provide control functions within the transmission control. These prior art devices were substantially replaced by vacuum operated throttle valves. The vacuum operated throttle valve provided a control signal more proportional to engine torque and also prevented the loss of TV pressure if the vacuum control became disconnected or otherwise inoperable.

Increased use of anti-pollution controls, however, have substantially reduced the relationship between inlet manifold vacuum and engine torque, thus making the utilization of manual throttle pressure valves again attractive. However, the presently available manual throttle valves still have one disadvantage in that if the mechanical control for example a bowden wire should become disconnected, the TV pressure will approach zero. If the TV pressure remains at a very low level, the transmission control function and operation of the friction devices in the transmission becomes erratic. Low TV pressure will generally result in low clutch apply pressure which reduces the clutch life. Low TV pressure will also result in premature upshifting within the transmission.

The present invention provides a control in which the output pressure of a throttle valve will be sustained at a high level should the mechanical input to the valve become disconnected. This situation would result in higher than normal control pressures thereby providing high engagement pressures for the clutches such that clutch life would not be affected. The operator of the vehicle would become aware that TV function is improper due to the fact that the upshifts would be delayed considerably thereby signalling a malfunction within the control system. However, the delayed upshifts and the high line pressures are not detrimental to the transmission operation.

It is an object of this invention to provide an improved manually operated pressure regulator valve which will prevent the loss of system pressure if the manual control becomes disconnected.

Another object of this invention is to provide an improved manually controlled pressure reducing valve wherein the exhause passage of the reducing valve is closed if the manual input becomes disconnected so that inlet and outlet pressures are equal.

These and other objects and advantages of the present invention will be more apparent from the following description and drawings wherein.

Figure 1:
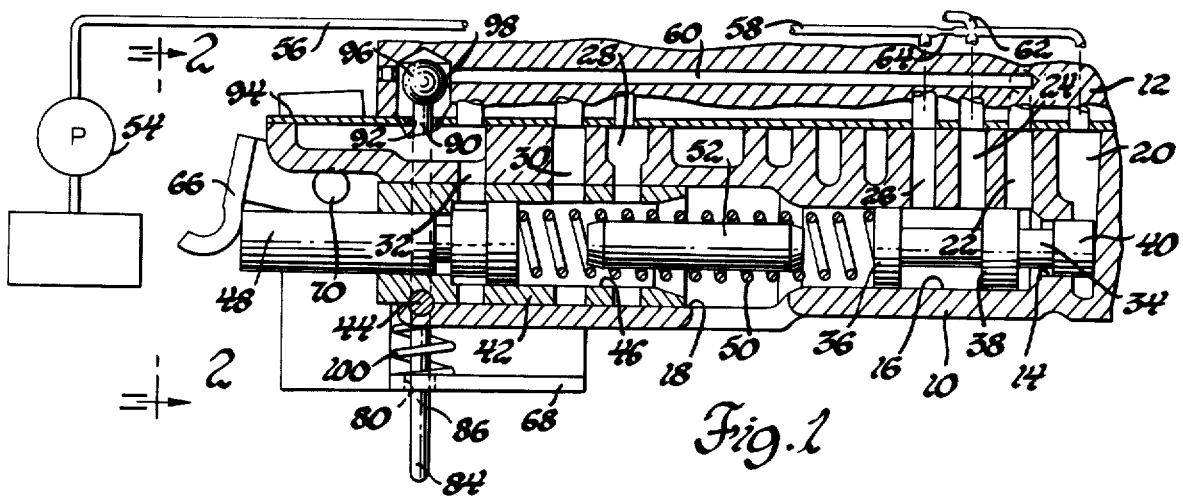
FIG. 1 is a cross-sectional elevational view of a valve incorporating the present invention.

Referring to the drawings, wherein like characters represent the same or corresponding parts there is seen in FIG. 1 a valve body portion 10 which is secured by fasteners not shown to a transmission case 12. The valve body 10 has a stepped valve bore formed therein which valve bore has three cylindrical portions 14, 16, and 18 of increasing diameter and a plurality of passages 20, 22, 24, 26, 28, 30, and 32 formed therein. A valve spool 34 is slidably disposed in the cylindrical portions 14 and 16 and has a pair of spaced equal diameter lands 36 and 38 cooperating with cylinder 16 and a smaller diameter land 40 cooperating with cylinder 14. The cylinder portion 18 has a sleeve 42 disposed therein and maintained in position in the valve body 10 by a pin 44. The sleeve 42 has an internal bore 46 in which is slidably disposed a manual plunger 48. A spring 50 is positioned between the manual plunger 48 and the valve spool 34 so that the input movement imposed on the manual plunger 48 is transmitted to the valve spool 34 as a force. A pin 52 is positioned internally of the spring 50 and is of a predetermined length to provide contact between plunger 48 and spool 34 so that the operator will have a detent or "knockdown" feel.

The manual plunger 48, spool 34 and spring 50 cooperate to provide a variable pressure reducing valve which provides throttle valve control pressure in the automatic transmission. A more complete operation of the valve is described in U.S. Ser. No. 396,554, filed Sept. 12, 1973, now U.S. Pat. No. 3,840,039 and assigned to the assignee of this application. This control valve can also be substituted in other known transmission controls such as U.S. Pat. No. 3,321,056, to replace the vacuum operated TV.

Fluid pressure is supplied by a conventional hydraulic pump 54 through a passage 56. The fluid pressure in passage 56 is directed to a transmission control such as that disclosed in U.S. Pat. No. 3,840,039 or U.S. Pat. No. 3,321,056, which transmission controls have a passage such as 58 which directs fluid pressure to the passage 26. Fluid pressure in passage 26 is communicated between lands 36 and 38 with passage 24 which is in fluid communication with passage 20. The fluid pressure in passage 20 operates on the end of valve land 40 to move the valve spool 34 to the left against spring 50 until the fluid pressure in passage 20 balances the spring force. As the valve spool 34 is moved to the left, valve land 38 provides fluid communication between passages 24 and 22 between lands 38 and 40. Passage 22 is connected to an exhaust passage 60 such that the pressure in passage 24 and 20 will be limited in proportion to spring force 50. The fluid pressure in passage 24 is connected to a passage 62 which distributes control pressure to the transmission control system in a manner described in U.S. Ser. No. 396,554. The passages 28, 30, and 32 are connected to provide detent and part throttle downshift functions as described in aforementioned Ser. No. or U.S. Pat. No. 3,321,056. A restriction 64 provides fluid communication between passages 58 and 62 to ensure that fluid pressure is continually available in passages 24 and 20. The purpose of this restriction will be described later.

Figure 2:
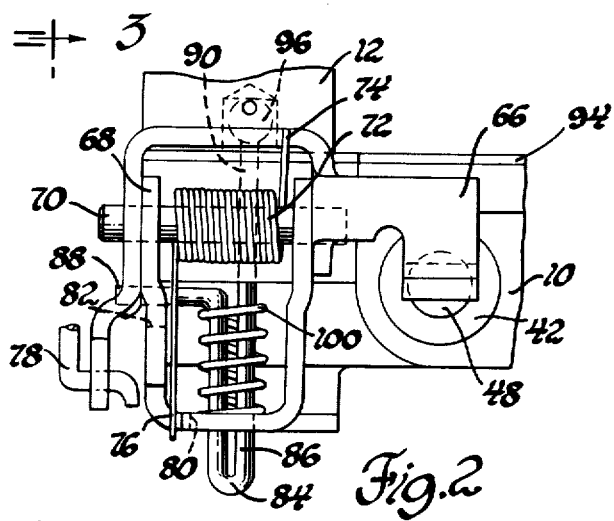
FIG. 2 is an end view of the valve shown in FIG. 1 when viewed in the direction of line 2—2.
Figure 3:
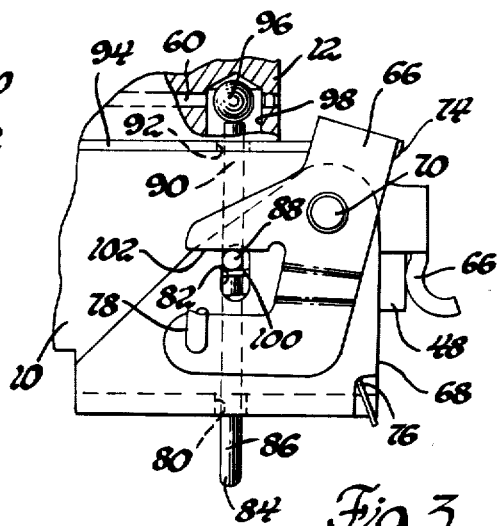
FIG. 3 is a partial elevational view of the valve when viewed in the direction of line 3—3.

The manual plunger 48 abuts a manual control lever 66 which manual control lever 66 is pivotally mounted on a bracket 68 by a pin 70 as shown in FIG. 2. A torsional spring 72 is disposed circumjacent a pin 70 and has a free end 74 acting on lever 66 and a free end 76 reacting on bracket 68. The torsion spring 72 provides a rotational force on lever 66 which tends to move the lever 66 in a clockwise direction when viewed in FIG. 1 and a counterclockwise direction when viewed in FIG. 3. Thus the torsional spring is disposed to urge the lever 66 out of contact with the manual plunger 48. The lever 66 is maintained in contact with the manual plunger 48 by a bowden wire or control cable 78. The control cable 78 can of course be replaced by the control linkage.

The bracket 68 is secured to the valve body 10 by a fastener not shown and has formed therein a slot 80 on the lower surface thereof and a slot 82 formed in one side surface thereof. A wire rod 84 has a U-shaped portion 86 which extends through the slot 80, an arm 88 which extends through the slot 82, and an upstanding portion 90 which extends through an opening 92 formed in a separater plate 94 disposed between the valve body 10 and the transmission case 12. The lower side of opening 92 is in fluid communication with the transmission sump. The upstanding portion 90 of the rod 84 contacts a ball 96 disposed in a cylindrical pocket 98 formed in the transmission case 12. The ball 96 has a substantially larger diameter than the opening 92 such that the opening 92 and the ball 96 will function as a check valve, as will be described later.

A compression spring 100 surrounds a portion of the U-shaped portion 86 of rod 84 and is compressed between the arm 88 and the bracket 68. The compression spring 100 urges the rod 84 upward so that the ball 96 is contacted and removed from the opening 92 to provide communication between passage 60 and the transmission sump; and the arm 88 contacts a flat surface 102 formed on a portion of the lever 66. The compression spring 100 has a light load imposed thereon such that if the torsion spring 72 is permitted to rotate the lever 66, as described above, the surface 102 will move the rod 84 downward thereby permitting the ball 96 to be seated against the opening 92. However, as long as the control cable 78 is mechanically connected to the lever 66 the torsion spring 72 cannot rotate the lever 66 past the position shown in FIG. 3.

Figure 4:
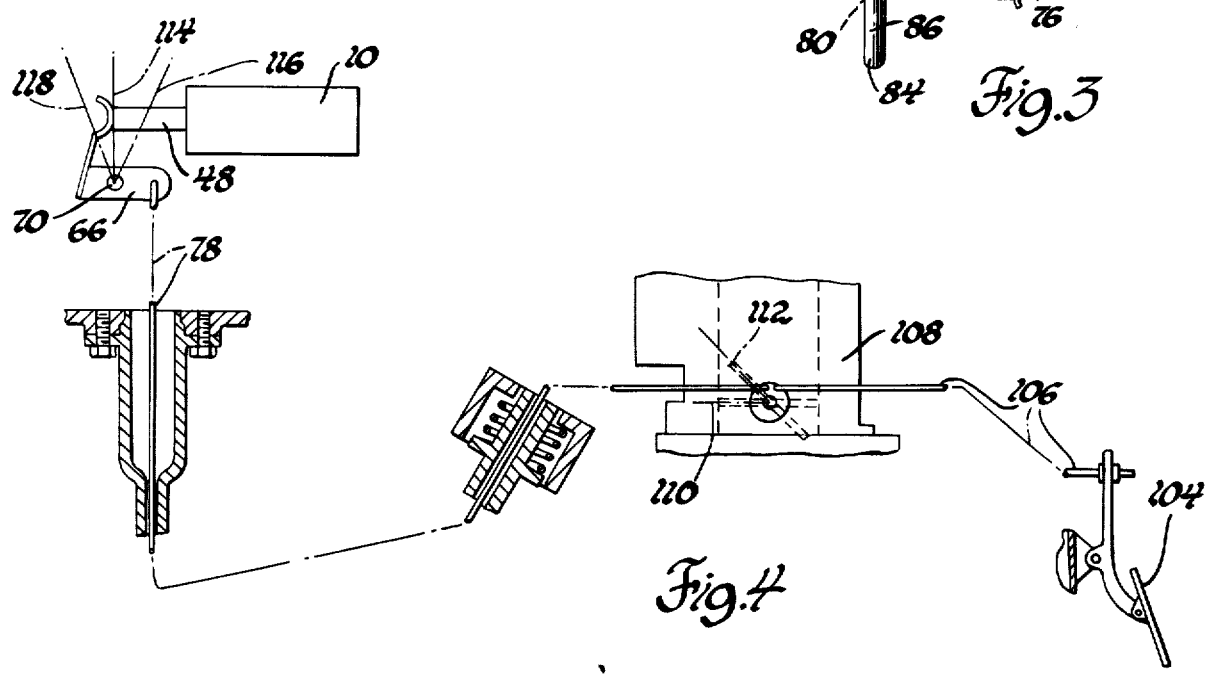
FIG. 4 is a schematic representation of a manual control for the present invention.

FIG. 4 is a schematic representation showing the manner in which the control cable 78 is connected in the system. Referring to FIG. 4 there is shown an accelerator pedal 104 connected by a conventional linkage or control cable 106 to an engine carburetor 108. The control cable 78 is connected between the carburetor 108 and the lever 66. The cable 78 is adjusted in a manner described in U.S. Pat. No. 3,752,008, such that as the accelerator pedal 104 is moved from closed throttle to a full throttle position, the carburetor plate to be operated between positions 110 and 112 while the control arm 66 is operated between positions 114 and 116. If the control cable 78 should become disconnected from the carburetor or from the lever 66, the lever 66 is moved to position 118 by the torsion spring 72. When the lever 66 is rotated to position 118 the ball 96 is permitted to seat on opening 92, as described above, thereby blocking passage 60 from the sump.

During normal operation of the vehicle the pressure in passages 20, 24, and 62 are proportional to the throttle opening position determined by the accelerator 104. As mentioned above, the restriction 64 will permit the continual passage of fluid between passages 58 and 62. However, the pressure in passage 62 is controlled by the opening of exhaust passage 22. The restriction 64 is made sufficiently small such that passage 22 can normally bypass more fluid than can be supplied. Therefore the pressure will be maintained at a level proportional to the force in spring 50. If the cable 78 should become disconnected, the ball 96 will seat on opening 92. This will prevent fluid pressure from being exhausted through passage 60 which is in communication with cylindrical opening 98. In this event, fluid pressure can be supplied to the passage 24 through restriction 64 thereby maintaining the control pressure in passage 62 at a high level. In most instances the pressure in passages 62 and 58 will become equal when the exhaust passage 60 is closed. Thus it can be seen that the utilization of this exhaust control in a manual control throttle valve will permit the control pressure to be maintained at a high level is manual disconnection, such as a broken calbe, should occur thereby preventing the malfunctions which have occurred with manual TV control systems in the past. The term "manual" is used in this specification and the appended claims to refer to the manual control of throttle position actuated through foot pedal 104, FIG. 4. The manual control thus effected normally moves the plunger 48 in accordance with throttle angular position as modified by crank 66 and the other associated elements in the system.

Obviously, many modifications and variations of the present invention are possible in light of the above teachings. It is, therefore, to be understood that within the scope of the appended claims the invention may be practiced otherwise than as specifically described.

What is claimed is:

1. A manually controlled throttle pressure regulator valve comprising; a valve body; fluid passage means in said valve body including an inlet pressure passage, an outlet pressure passage, and an exhaust pressure passage; valve means disposed in said valve body for providing selective fluid communication between said inlet and outlet passages and between said outlet and exhaust passages; manually operated means for imposing a manually controlled bias on said valve means for establishing a variable pressure between maximum and minimum values in said outlet passage proportional to said bias, said valve means establishing communication between said outlet passage and said exhaust passage for reducing the pressure in said outlet passage when the pressure therein is greater than the bias; operator control means mechanically connected to said manually operated means for transmitting operator motion to said manually operated means; and exhaust control means for preventing exhausting of said outlet passage and maintaining the pressure level in said outlet passage at a predetermined value when said operator control means is disconnected from said manually operated means.

2. A manually controlled throttle pressure regulator valve comprising; a valve body; fluid passage means in said valve body including an inlet pressure passage, an outlet pressure passage, and an exhaust pressure passage; valve means disposed in said valve body for providing selective fluid communication between said inlet and outlet passages and between said outlet and exhaust passages; manually operated means for imposing a manually controlled bias on said valve means for establishing a variable pressure between maximum and minimum values in said outlet passage proportional to said bias, said valve means establishing communication between said outlet passage and said exhaust passage for reducing the pressure in said outlet passage when the pressure is greater than the bias; operator control means mechanically connected to said manually operated means for transmitting operator motion to said manually operated means; and exhaust control means for preventing exhausting of said outlet passage and maintaining the pressure level in said outlet passage at a predetermined value when said operator control means is disconnected from said manually operated means including a ball valve in said exhaust passage, and a rod means operatively connected between said manually operated means and said ball valve for maintaining said ball valve open when said operator control means is connected.

3. A manually controlled throttle pressure regulator valve comprising; a valve body; fluid passage means in said valve body including an inlet pressure passage, an outlet pressure passage, and an exhaust pressure passage; sliding valve means disposed in said valve body for providing selective fluid communication between said inlet and outlet passages and between said outlet and exhaust passages; manually operated means for imposing a manually controlled bias on said valve means for establishing a variable pressure between maximum and minimum values in said outlet passage proportional to said bias including a manual plunger, a spring disposed between said manual plunger and said valve means, a bracket, a lever rotatably supported on said bracket having a first surface contacting said manual plunger and a second surface, ball valve means disposed in said exhaust passage, rod means mounted in said bracket, first spring means urging said rod means to contact and open said ball valve means; and second spring means operatively connected between said lever and bracket for urging said second surface to contact said rod means to move said rod means out of contact with said ball valve means, said sliding valve means establishing communication between said outlet passage and said exhaust passage for reducing the pressure in said outlet passage when the pressure therein is greater than the bias; and operator control means mechanically connected to said lever for transmitting operator motion to said lever; said second spring means moving said rod means to permit closing of said ball valve means for preventing exhausting of said outlet passage and maintaining the pressure level in said outlet passage at a value substantially equal to inlet pressure when said operator control means is disconnected from said lever.

* * * * *